United States Patent
Hamaoka et al.

(10) Patent No.: US 11,552,359 B2
(45) Date of Patent: Jan. 10, 2023

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Satoshi Hamaoka, Kariya (JP); Taku Inoue, Kariya (JP); Hiromi Ueda, Kariya (JP); Kojiro Tamaru, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 17/147,878

(22) Filed: Jan. 13, 2021

(65) Prior Publication Data
US 2021/0234221 A1 Jul. 29, 2021

(30) Foreign Application Priority Data
Jan. 24, 2020 (JP) .............................. JP2020-009772

(51) Int. Cl.
*H01G 2/08* (2006.01)
*H01G 11/10* (2013.01)
(Continued)

(52) U.S. Cl.
CPC ............ *H01M 50/186* (2021.01); *H01G 2/08* (2013.01); *H01G 11/10* (2013.01); *H01G 11/26* (2013.01); *H01M 10/0585* (2013.01); *H01M 10/282* (2013.01); *H01M 10/613* (2015.04); *H01M 10/625* (2015.04); *H01M 10/647* (2015.04); *H01M 10/6557* (2015.04); *H01M 50/209* (2021.01); *H01M 50/249* (2021.01);
(Continued)

(58) Field of Classification Search
None
See application file for complete search history.

(56) References Cited

U.S. PATENT DOCUMENTS

2012/0315519 A1* 12/2012 Jin ...................... H01M 10/613
429/99
2020/0340592 A1* 10/2020 Nakayama .............. F16K 17/02

FOREIGN PATENT DOCUMENTS

JP 2005-135764 A 5/2005
WO WO2018142919 A1 * 8/2018

* cited by examiner

*Primary Examiner* — Lisa S Park
(74) *Attorney, Agent, or Firm* — Sughrue Mion, PLLC

(57) ABSTRACT

A power storage device includes a plurality of power storage modules laminated, a conductive plate and a sealing member. The conductive plate and the sealing member are provided between the power storage modules adjacent to each other in a laminating direction of the power storage modules. The plurality of power storage modules each have an electrode laminate, an electrolytic solution, and a sealing body. The electrode laminate has electrode exposed portions exposed from the sealing body at one end and the other end in the laminating direction. Between the power storage modules adjacent to each other in the laminating direction, the conductive plate is disposed between the electrode exposed portions opposing each other to be in contact with the electrode exposed portions, and at least a portion between the sealing bodies opposing each other is filled with the sealing member.

11 Claims, 7 Drawing Sheets

(51) Int. Cl.
*H01G 11/26* (2013.01)
*H01M 10/0585* (2010.01)
*H01M 10/613* (2014.01)
*H01M 10/625* (2014.01)
*H01M 10/647* (2014.01)
*H01M 10/6557* (2014.01)
*H01M 50/209* (2021.01)
*H01M 50/249* (2021.01)
*H01M 50/26* (2021.01)
*H01M 50/317* (2021.01)
*H01M 50/186* (2021.01)
*H01M 10/28* (2006.01)

(52) U.S. Cl.
CPC ......... *H01M 50/26* (2021.01); *H01M 50/317* (2021.01); *H01M 2220/20* (2013.01)

POWER STORAGE DEVICE

TECHNICAL FIELD

The present disclosure relates to a power storage device.

BACKGROUND

As a power storage device of the related art, known is a power storage device including a plurality of power storage modules laminated. As a power storage module of the related art, known is a bipolar battery including a bipolar electrode in which a positive electrode is formed on a first surface of an electrode plate and a negative electrode is formed on a second surface of the electrode plate. For example, a bipolar battery disclosed in Japanese Unexamined Patent Publication No. 2005-135764 includes an electrode laminate having a plurality of laminated bipolar electrodes and a polypropylene cell casing (sealing body) provided on a side surface of the electrode laminate. A polypropylene layer is provided at the edge portion of the bipolar electrode, and the bipolar electrode and the cell casing are firmly fixed through the polypropylene layer by integral molding. Therefore, it is possible to seal an electrolytic solution.

SUMMARY

In a power storage module as described above, when the electrolytic solution is an alkaline aqueous solution, there is a case where a so-called alkaline creep phenomenon causes the electrolytic solution to propagate on an electrode plate of each electrode, pass through a gap between the polypropylene layer and the electrode plate, and seep out on the external surface side of the electrode plate. If the alkaline creep phenomenon occurs at the outermost electrode, the electrolytic solution leaks out of the system. Without being limited to the alkaline creep phenomenon, if liquid leakage occurs, there is a concern that a short circuit (tracking) may occur between the power storage modules laminated.

The present disclosure provides a power storage device capable of suppressing the occurrence of a short circuit between power storage modules.

A power storage device of the present disclosure includes a plurality of power storage modules laminated, a conductive plate and a sealing member. The conductive plate and the sealing member are provided between the power storage modules adjacent to each other in a laminating direction of the power storage modules. The plurality of power storage modules each have an electrode laminate, an electrolytic solution, and a sealing body. The electrode laminate includes a plurality of electrodes laminated along the laminating direction of the power storage modules through a separator. The electrolytic solution is accommodated in an internal space formed between the electrodes adjacent to each other. The sealing body surrounds a side surface of the electrode laminate along the laminating direction and seals the internal space. The plurality of electrodes have a negative terminal electrode, a positive terminal electrode, and a plurality of bipolar electrodes laminated between the negative terminal electrode and the positive terminal electrode. The plurality of bipolar electrodes each have an electrode plate, a positive electrode provided on a first surface of the electrode plate, and a negative electrode provided on a second surface of the electrode plate. The electrode laminate has electrode exposed portions exposed from the sealing body at one end and the other end in the laminating direction. Between the power storage modules adjacent to each other in the laminating direction, the conductive plate is disposed between the electrode exposed portions opposing each other to be in contact with the electrode exposed portions, and at least a portion between the sealing bodies opposing each other is filled with the sealing member.

In this power storage device, between the power storage modules adjacent to each other in the laminating direction, at least a part of the portion between the sealing bodies opposing each other is filled with the sealing member. Therefore, even when the electrolytic solution leaks from the internal space of the power storage module and flows out to the outer peripheral surface of the sealing body, in the portion filled with the sealing member, it is possible to suppress the entering of the electrolytic solution that propagates on the outer peripheral surface of the sealing body. Therefore, it is possible to suppress the occurrence of a short circuit between the power storage modules via the electrolytic solution that propagates on the outer peripheral surface of the sealing body.

The sealing body may have an outer peripheral surface along the laminating direction, a pair of end surfaces facing the laminating direction, and an overhang provided on the outer peripheral surface and overhanging toward an outside of the electrode laminate. The end surface may have a first portion corresponding to an overhang installation place and a second portion not corresponding to the installation place. The sealing member may be provided at least on the second portion. In this case, at the first portion corresponding to the overhang installation place in the end surface of the sealing body, since the electrolytic solution propagates on the overhang and falls even when the electrolytic solution flows out to the outer peripheral surface, it is possible to suppress the entering of the electrolytic solution. In the second portion not corresponding to the overhang installation place, since the sealing member is provided, it is possible to suppress the entering of the electrolytic solution. Therefore, it is possible to reliably suppress the occurrence of a short circuit between the power storage modules via the electrolytic solution that propagates on the outer peripheral surface of the sealing body.

The first portion and the second portion may be adjacent to each other in a circumferential direction of the sealing body. The sealing member may also be provided in the first portion. In this case, it is possible to further suppress a short circuit between the power storage modules caused by liquid leakage.

A cooling flow path through which a cooling fluid flows may be formed in the conductive plate. The conductive plate may be disposed such that an inlet and an outlet of the cooling flow path correspond to the first portion. In this case, it is possible to suppress the inlet and the outlet of the cooling flow path being blocked by the sealing member.

The power storage module may have a pressure adjusting valve configured to adjust a pressure of the internal space. The pressure adjusting valve may be attached to the outer peripheral surface corresponding to the second portion. In this case, since the overhang is not provided on the outer peripheral surface corresponding to the second portion, it is possible to easily attach the pressure adjusting valve to the outer peripheral surface.

The sealing member may be adhered to the sealing body. In this case, the misalignment of the sealing member is suppressed.

DETAILED DESCRIPTION

Hereinafter, an embodiment of the present invention will be described in detail with reference to the accompanying drawings. In the description of the drawings, the same reference sign will be used for the same element or elements having the same function, and the elements will not be described repeatedly.

Figure 1:
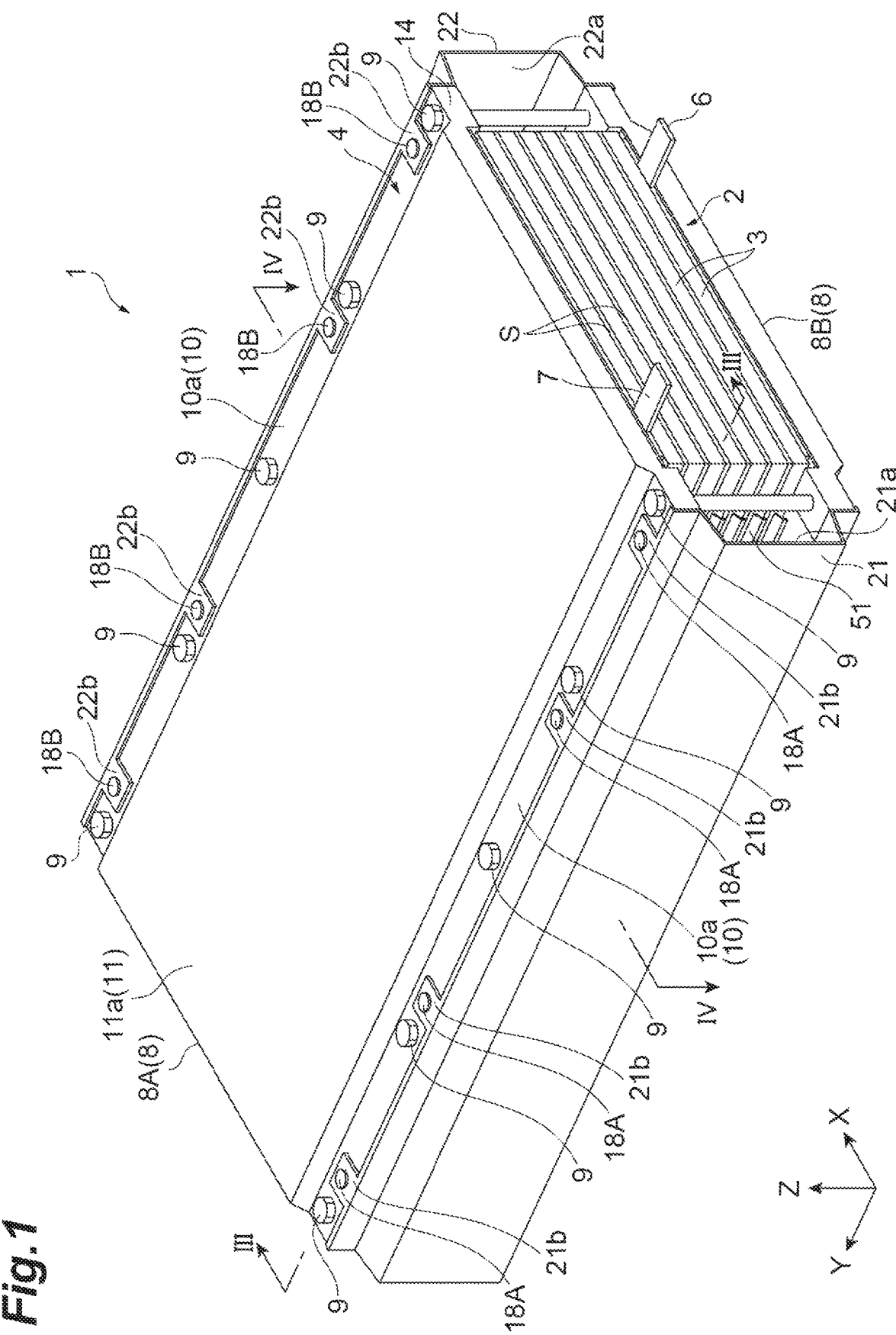
FIG. 1 is a perspective view of a power storage device according to an embodiment.
Figure 2:
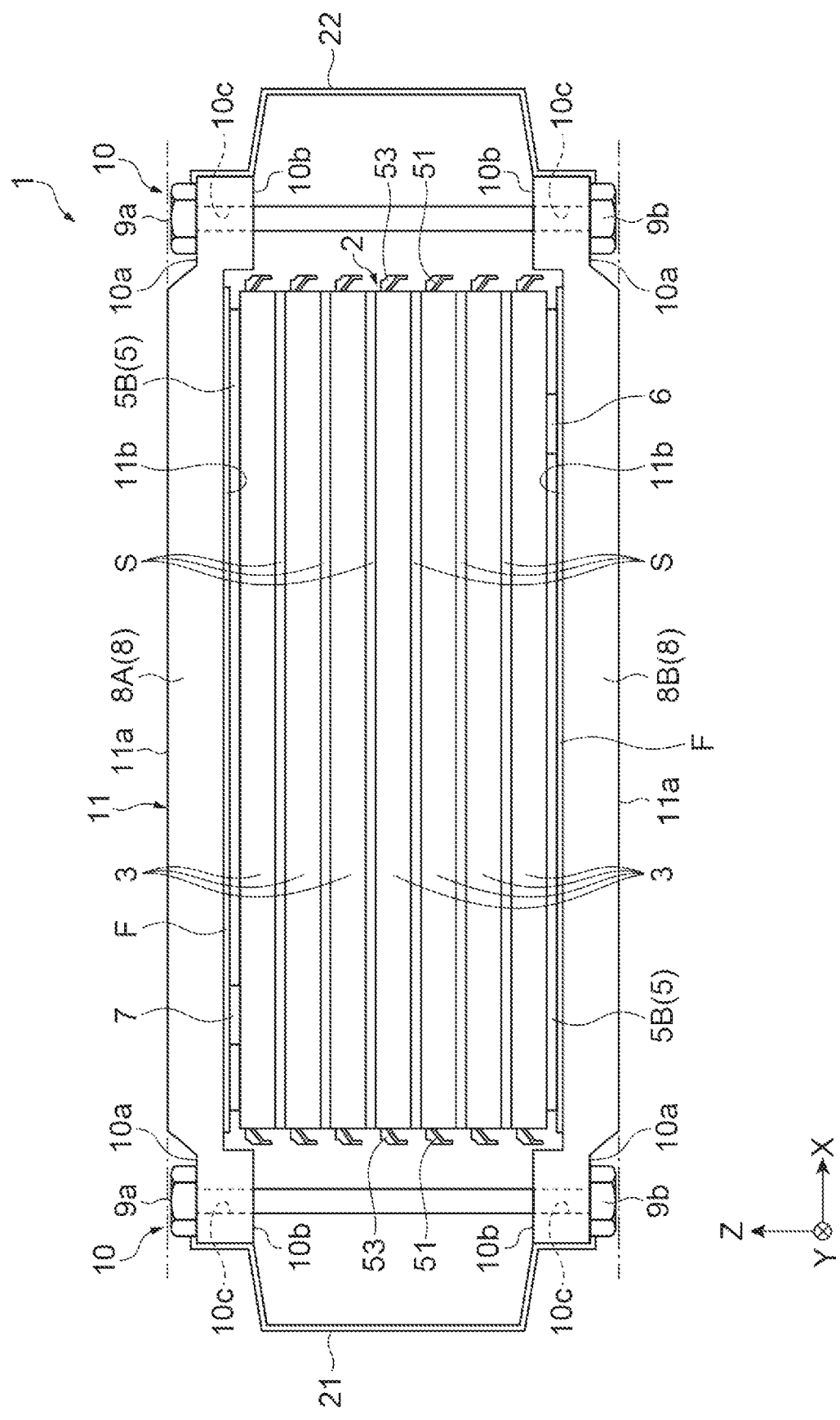
FIG. 2 is a side view of the power storage device.
Figure 3:
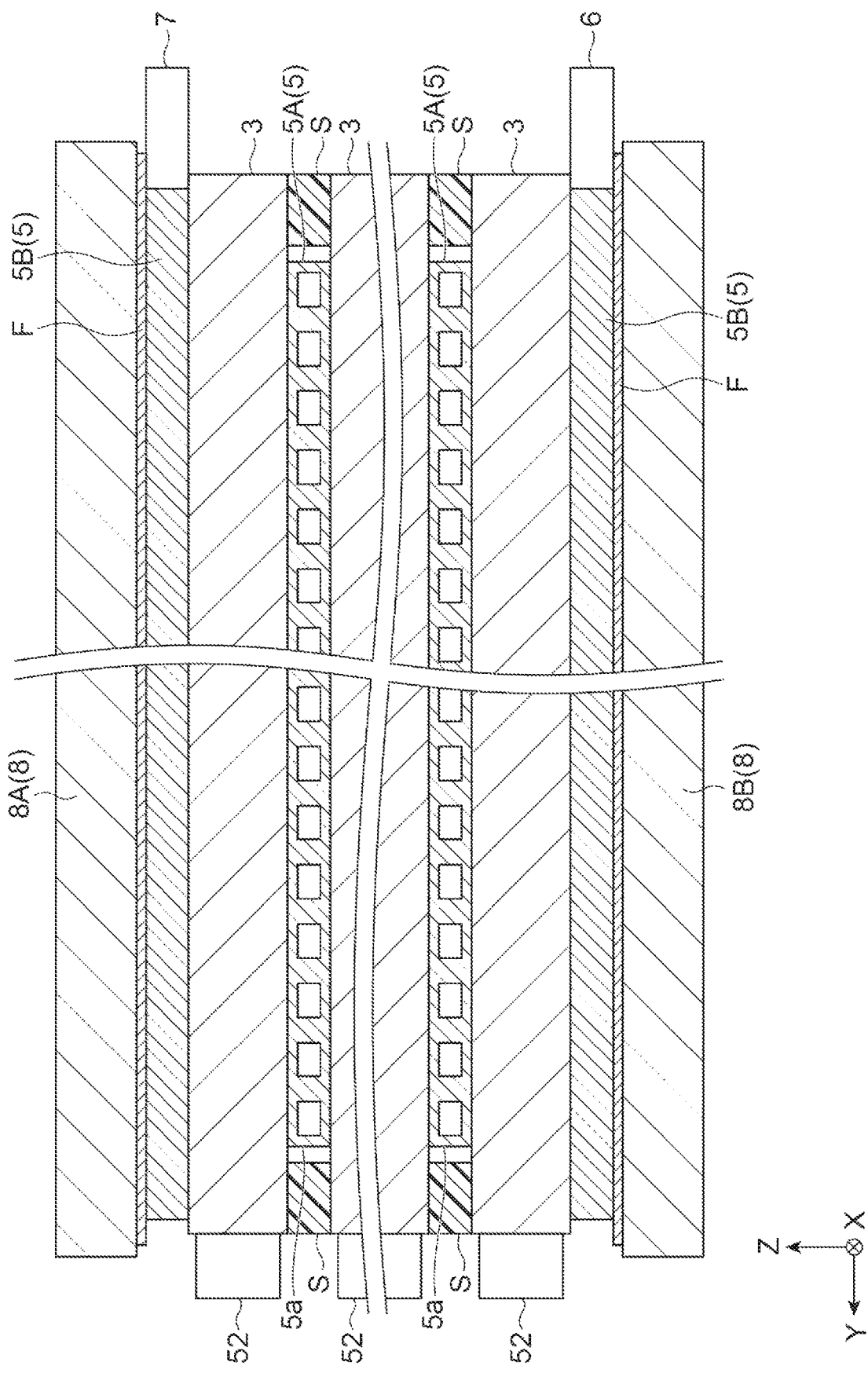
FIG. 3 is a sectional view taken along a line III-III in FIG. 1.
Figure 4:
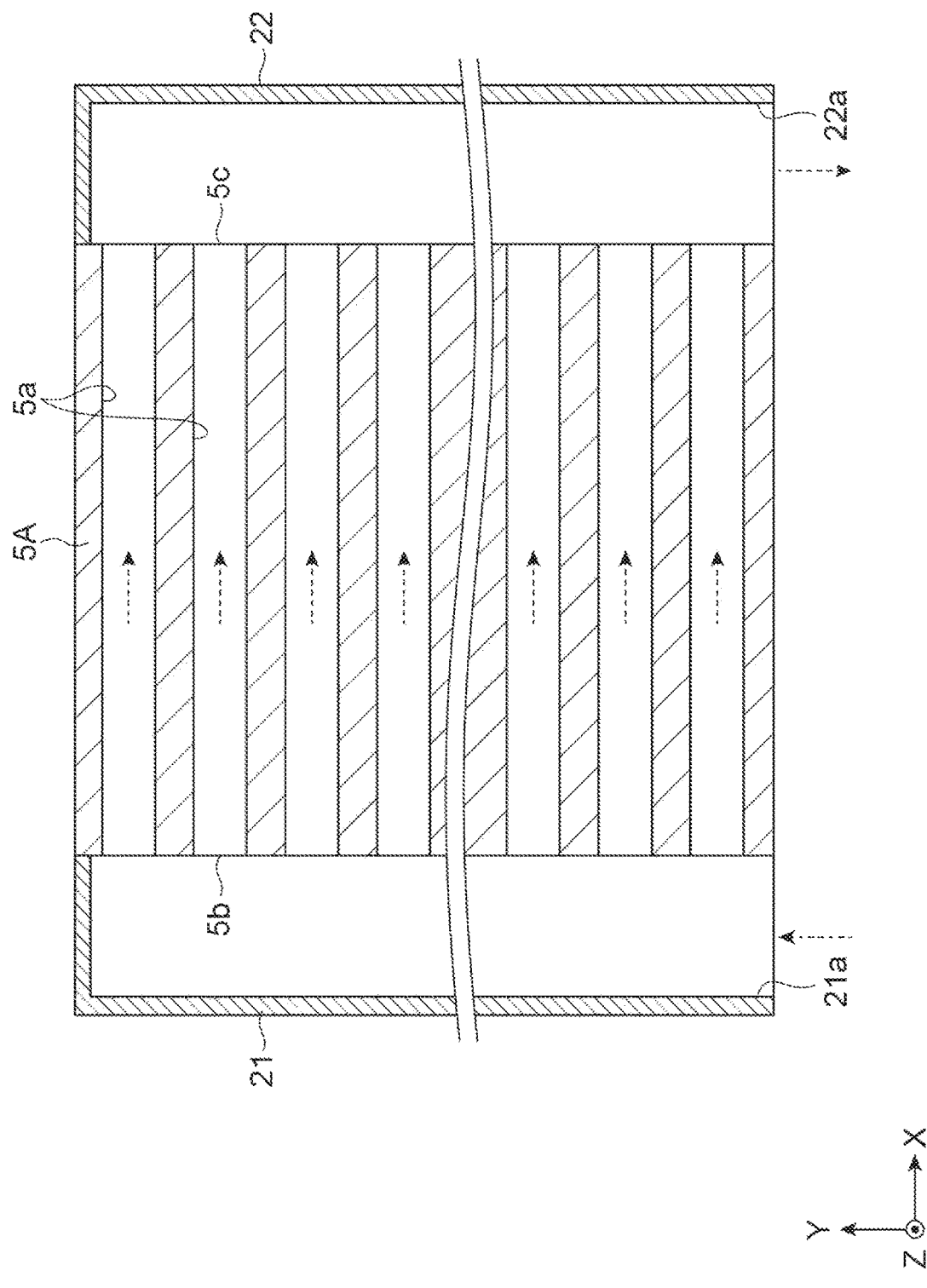
FIG. 4 is a sectional view taken along a line IV-IV in FIG. 1.
Figure 5:
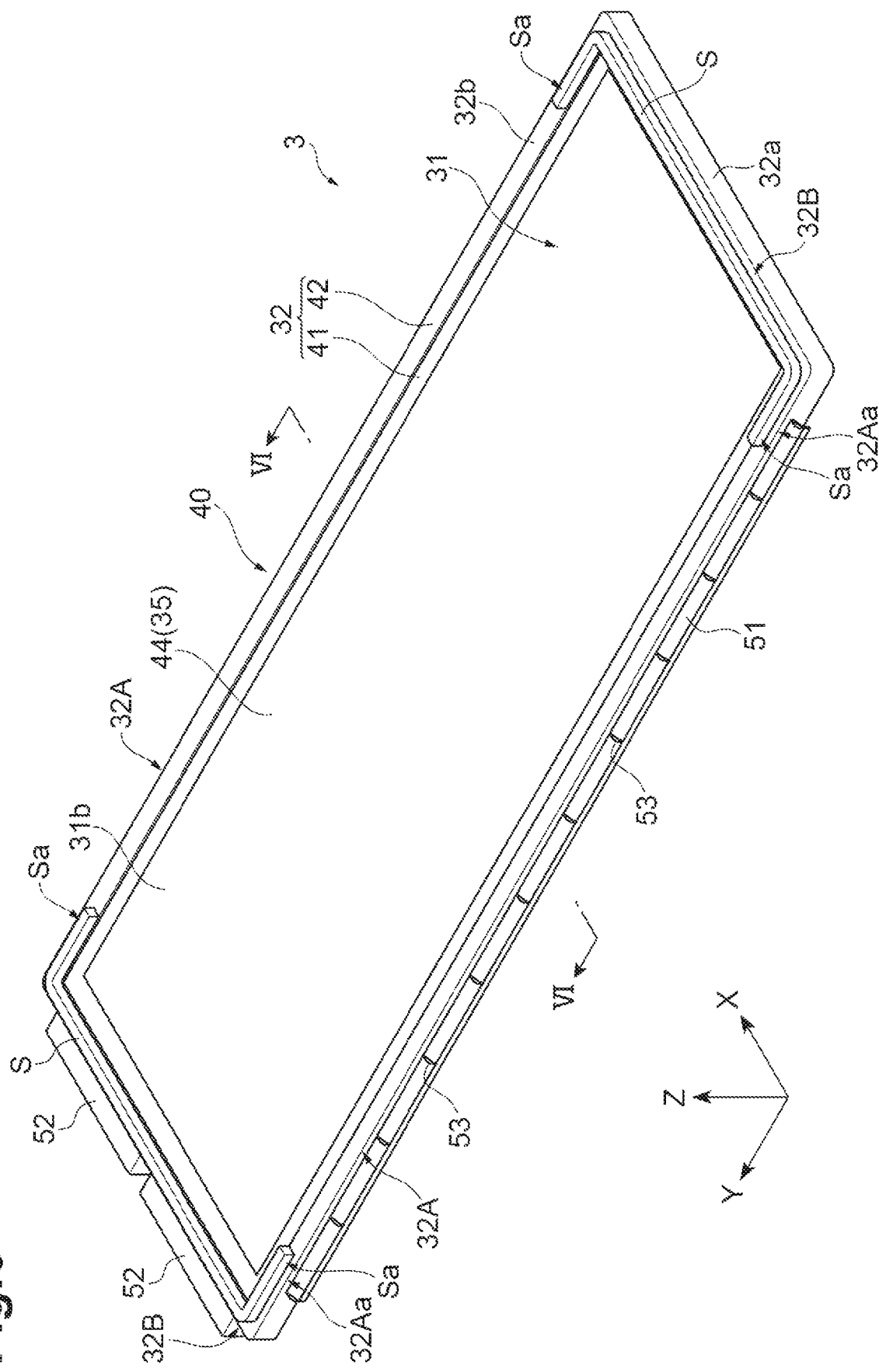
FIG. 5 is a perspective view of a power storage module provided with a sealing member.
Figure 6:
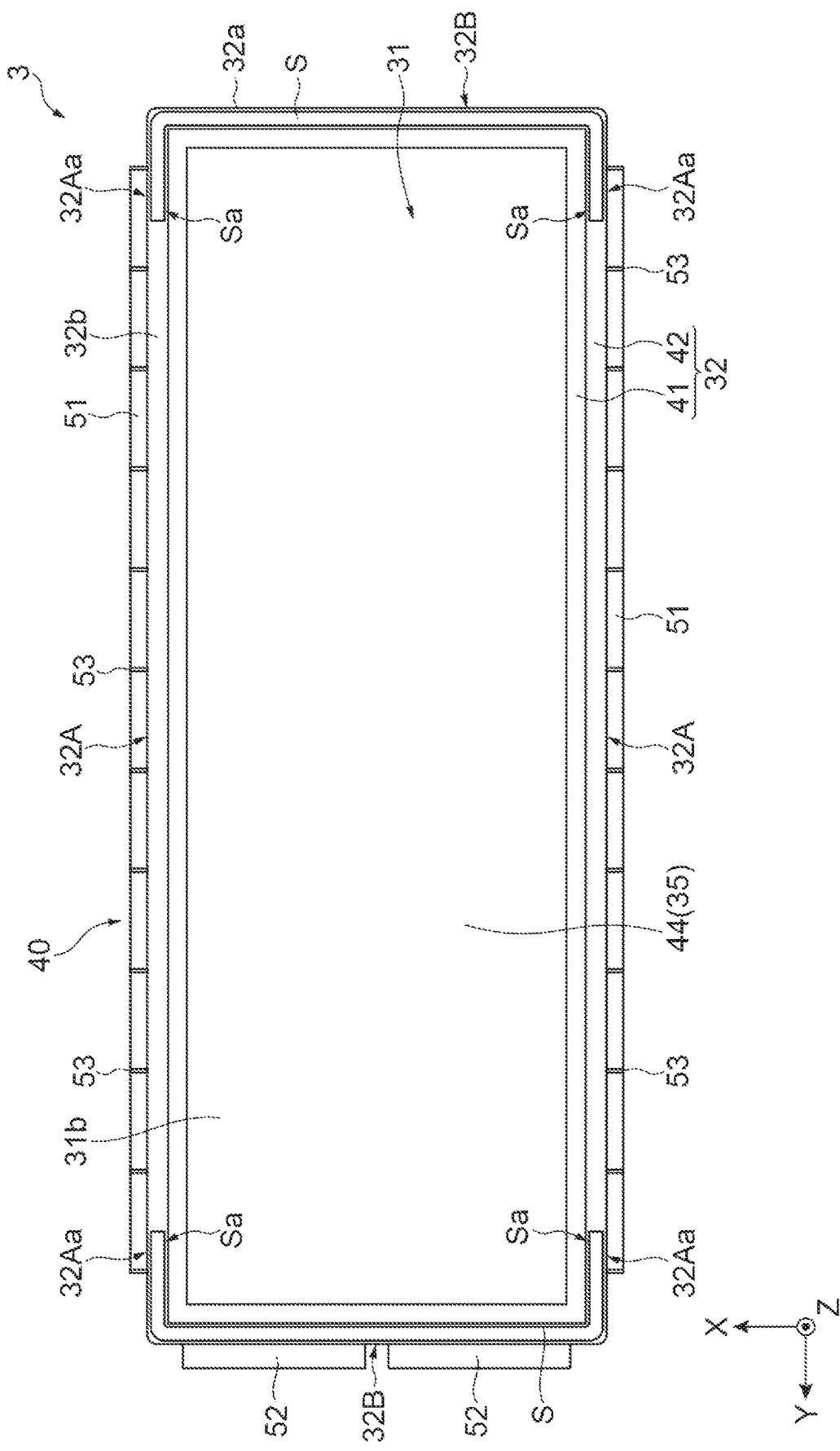
FIG. 6 is a top view of the power storage module provided with the sealing member.
Figure 7:
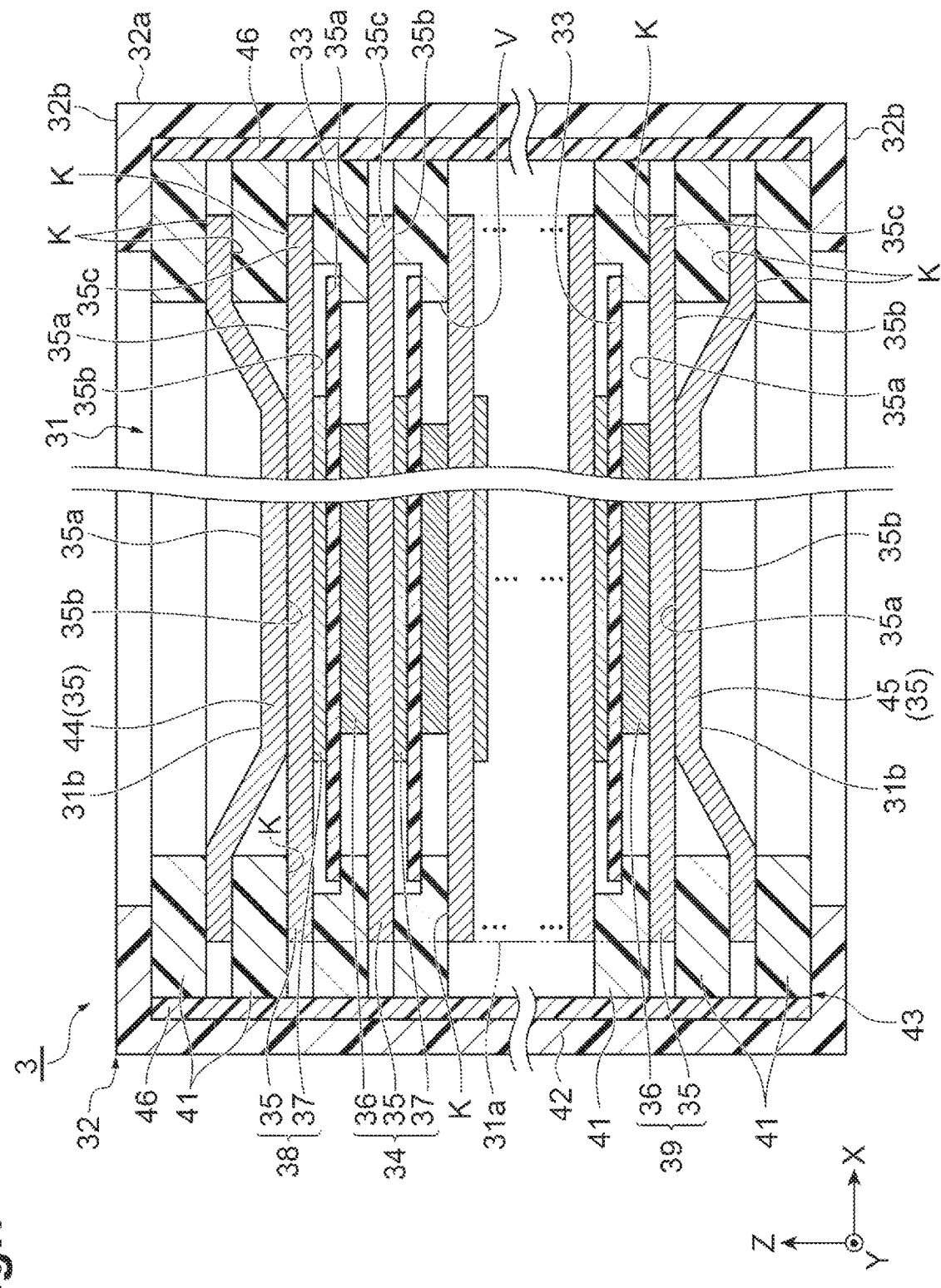
FIG. 7 is a sectional view of the power storage module.

A power storage device 1 according to the present embodiment will be described with reference to FIG. 1 to FIG. 7. FIG. 1 is a perspective view of the power storage device 1. FIG. 2 is a side view of the power storage device 1. FIG. 3 is a sectional view taken along a line III-III in FIG. 1. FIG. 4 is a sectional view taken along a line IV-IV in FIG. 1. FIG. 5 is a perspective view of a power storage module 3 provided with a sealing member S. FIG. 6 is a top view of the power storage module 3 provided with the sealing member S. FIG. 7 is a sectional view of the power storage module 3.

The power storage device 1 is used as a battery for a variety of vehicles, for example, a forklift, a hybrid vehicle, an electric vehicle, and the like. The power storage device 1 includes a module laminate 2 and a restraining member 4. The module laminate 2 includes a plurality of power storage modules 3 laminated together. The restraining member 4 applies a restraining load to the module laminate 2 from both sides in the laminating direction of the power storage modules 3. The power storage module 3 has, for example, a rectangular shape when seen in the laminating direction. In the present specification, for the convenience of description, the laminating direction is defined as the Z-axis direction, the longitudinal direction of the power storage module 3 seen in the laminating direction is defined as the Y-axis direction, and the lateral direction of the power storage module 3 is defined as the X-axis direction.

The module laminate 2 includes a plurality of (seven in the present embodiment) power storage modules 3, a plurality of (eight in the present embodiment) conductive plates 5, and sealing members S. The power storage module 3 is, for example, a bipolar battery. The power storage module 3 is, for example, a secondary battery such as a nickel metal hydride secondary battery or a lithium ion secondary battery. Here, the power storage device 1 is not limited to the above-described secondary battery and may be, for example, an electric double layer capacitor. In the present embodiment, the power storage device 1 is a nickel metal hydride secondary battery.

The plurality of power storage modules 3 are laminated through the conductive plates 5. The power storage modules 3 adjacent to each other in the laminating direction are electrically connected to each other through the conductive plate 5. In the present embodiment, as shown in FIG. 3, the plurality of conductive plates 5 include a plurality of conductive plates 5A and a plurality of conductive plates 5B (conductive members). The number of the conductive plates 5 is, for example, eight, the number of the conductive plates 5A is, for example, six, and the number of the conductive plates 5B is, for example, two. The conductive plate 5A is provided between the power storage modules 3 adjacent to each other in the laminating direction. Between the power storage modules 3 adjacent to each other in the laminating direction, the conductive plate 5A is disposed between electrode exposed portions 31b of electrode laminates 31 opposing each other to be in contact with the electrode exposed portions 31b. The electrode exposed portion 31b will be described below. The conductive plates 5B are provided outside, among the plurality of power storage modules 3, the power storage modules 3 positioned at the laminate ends in the laminating direction. As shown in FIG. 1 and FIG. 2, a positive electrode terminal 6 (electrode terminal) is connected to one of the conductive plates 5B. A negative electrode terminal 7 (electrode terminal) is connected to the other conductive plate 5B. The positive electrode terminal 6 and the negative electrode terminal 7 protrude from the edge portions of the conductive plates 5B in a direction intersecting the laminating direction (Y-axis direction). With the positive electrode terminal 6 and the negative electrode terminal 7, the power storage device 1 is charged and discharged.

As shown in FIG. 3 and FIG. 4, a plurality of cooling flow paths 5a configured to flow a cooling fluid are formed in the conductive plate 5A. Here, as the cooling fluid, for example, air, water, or the like is used. The cooling flow path 5a extends along an intersection direction (X-axis direction) that intersects the laminating direction (Z-axis direction). The direction in which the cooling flow path 5a extends (X-axis direction) is orthogonal to both the laminating direction (Z-axis direction) and a direction in which the positive electrode terminal 6 and the negative electrode terminal 7 are drawn (Y-axis direction). The conductive plate 5A functions as a heat dissipation plate configured to dissipate heat generated from the power storage module 3 when the cooling fluid is flowed in the cooling flow paths 5a.

The conductive plate 5 has, for example, a rectangular shape when seen in the laminating direction. A pair of end portions 5b and 5c of the cooling flow path 5a are provided on a pair of side surfaces of the conductive plate 5 facing the X-axis direction, respectively. In the present embodiment, the area of the conductive plate 5 seen in the laminating direction is smaller than the area of the power storage module 3. From the viewpoint of improving the heat dissipation property, the area of the conductive plate 5 may be the same as the area of the power storage module 3 or may be larger than the area of the power storage module 3.

The sealing member S is provided between the power storage modules 3 adjacent to each other in the laminating direction. In the present embodiment, the sealing member S is disposed together with the conductive plate 5A between the power storage modules 3 adjacent to each other in the laminating direction. The sealing member S is disposed outside the conductive plate 5A. It should be noted that the sealing member S may also be disposed together with the conductive plate 5B outside each of the power storage modules 3 positioned at the laminate ends in the laminating direction. The specific disposition of the sealing members S will be described below.

As shown in FIG. 1, FIG. 2, and FIG. 4, the power storage device 1 has an introduction duct 21 and an extraction duct 22 each configured to flow the cooling fluid for cooling the power storage modules 3. Here, FIG. 4 shows a cross section along a plane that passes through the central portion of one conductive plate 5A in the laminating direction. In FIG. 4, for the convenience of description, only one conductive plate 5A, the introduction duct 21, and the extraction duct 22 are shown.

The introduction duct 21 is provided to oppose the end portions 5b on one side of the individual cooling flow paths 5a in each conductive plate 5A and extend along the Y-axis direction. The introduction duct 21 is configured to flow the cooling fluid to introduce the cooling fluid into the cooling flow paths 5a. At one end of the introduction duct 21 in the Y-axis direction, an introduction port 21a for introducing the cooling fluid into the introduction duct 21 is provided. The cooling fluid introduced from the introduction duct 21 into the end portions 5b of the cooling flow paths 5a flows in the cooling flow paths 5a and is extracted from the end portions 5c on the other side of the cooling flow paths 5a.

The extraction duct 22 is provided to oppose the end portions 5c of the individual cooling flow paths 5a in each conductive plate 5A and extend along the Y-axis direction. The extraction duct 22 is configured to flow the cooling fluid extracted from the end portions 5c of the cooling flow paths 5a. At one end of the extraction duct 22 in the Y-axis direction, an extraction port 22a for discharging the cooling fluid to the outside from the extraction duct 22 is provided. To the extraction port 22a, for example, a blower or the like configured to suck the cooling fluid in the extraction duct 22 is connected.

As shown in FIG. 1 and FIG. 2, the restraining member 4 includes a pair of restraining plates 8 (a restraining plate 8A on the negative electrode terminal 7 side and a restraining plate 8B on the positive electrode terminal 6 side) configured to sandwich the module laminate 2 from both sides in the laminating direction and a plurality of (10 in the present embodiment) coupling members 9 configured to couple the pair of restraining plates 8. The coupling members 9 apply a restraining load to the module laminate 2 in the laminating direction through the pair of restraining plates 8. In the present embodiment, the coupling member 9 is made up of a bolt 9a and a nut 9b each configured to fasten the pair of restraining plates 8.

The restraining plate 8 is a rectangular metal plate having an area slightly larger than the area of each of the power storage module 3 and the conductive plate 5 when seen in the laminating direction. Between each restraining plate 8 and the conductive plate 5B, for example, an insulating film F such as a resin film is disposed. The insulating film F insulates the restraining plate 8 and the conductive plate 5B from each other. The insulating film F has, for example, a rectangular shape when seen in the laminating direction. In the present embodiment, the area of the insulating film F seen in the laminating direction is larger than the area of each of the power storage module 3 and the conductive plate 5, but is smaller than the area of the restraining plate 8.

The restraining plate 8 has a central portion 11 that overlaps the module laminate 2 when seen in the laminating direction and edge portions 10 that extend in a direction (the Y-axis direction in the present embodiment) orthogonal to the laminating direction from the central portion 11 and do not overlap the module laminate 2 when seen in the laminating direction. In the present embodiment, the pair of edge portions 10 are provided on both sides of the central portion 11 in the X-axis direction. That is, the central portion 11 is sandwiched between the pair of edge portions 10. The edge portion 10 has an outer surface 10a facing outside in the laminating direction and an inner surface 10b facing inward in the laminating direction. The central portion 11 has an outer surface 11a facing outside in the laminating direction and an inner surface 11b facing inward in the laminating direction. The outer surface 10a is positioned inside the outer surface 11a in the laminating direction. The inner surface 10b is positioned inside the inner surface 11b in the laminating direction.

The pair of edge portions 10 are outer edge portions that extend in the longitudinal direction (Y-axis direction) of the restraining plate 8. The pair of edge portions 10 are disposed not to overlap the module laminate 2 when seen in the laminating direction. Each edge portion 10 is provided with a plurality of (five in the present embodiment) insertion holes 10c through which the bolts 9a are inserted. In each edge portion 10, the plurality of insertion holes 10c are disposed to be separated from each other along the longitudinal direction (Y-axis direction) of the restraining plate 8. In the present embodiment, the plurality of insertion holes 10c are disposed at equal intervals from one end to the other end of the edge portion 10 in the longitudinal direction of the restraining plate 8.

The head portion of the bolt 9a is disposed on the outer surface 10a of the restraining plate 8A. The distal end portion (screw tip) of the shaft portion of the bolt 9a protrudes from the outer surface 10a of the restraining plate 8B. The nut 9b is screwed into the distal end portion of the bolt 9a. The nut 9b is disposed on the outer surface 10a of the restraining plate 8B. Therefore, the plurality of power storage modules 3 and the plurality of conductive plates 5 are interposed by the restraining plates 8A and 8B and unitized as the module laminate 2. In addition, a restraining load in the laminating direction is applied to the module laminate 2.

The inner surfaces 10b are positioned outside all of the conductive plates 5A in the laminating direction. That is, when seen in the X-axis direction, the inner surfaces 10b are positioned outside, among the plurality of conductive plates 5A, the conductive plates 5A positioned in the outermost layers in the laminating direction. That is, neither inlets (end portions 5b) nor outlets (end portions 5c) of the cooling flow paths 5a in all of the conductive plates 5A are covered with the edge portions 10. As a result, it is possible to smoothly introduce the cooling fluid from the introduction duct 21 into the cooling flow paths 5a and to smoothly extract the cooling fluid from the cooling flow paths 5a to the extraction duct 22. Therefore, it is possible to reliably flow the cooling fluid through the cooling flow paths 5a in the conductive plates 5A.

As described above, the positive electrode terminal 6 and the negative electrode terminal 7 protrude from the side surfaces (the side surfaces intersecting the Y-axis direction) of the conductive plates 5B along the lateral direction (X-axis direction). The electrode terminals (the positive electrode terminal 6 and the negative electrode terminal 7) are drawn from the side surfaces of the conductive plates 5B that do not oppose the edge portions 10 as described above, whereby it is possible to reliably prevent the interference between the electrode terminals and the edge portions 10. When the introduction duct 21 and the extraction duct 22 are provided at positions opposing the side surface of the module laminate 2 along the longitudinal direction (Y-axis direction) as in the present embodiment, it is also possible to prevent the interference between the electrode terminal and the introduction duct 21 or the extraction duct 22.

As shown in FIG. 1, in the present embodiment, the introduction duct 21 is fixed to one edge portion 10 (the edge portion 10 on one end portion 5b side of the cooling flow path 5a) with four fixation screws 18A. The extraction duct 22 is fixed to the other edge portion 10 (the edge portion 10 on the other end portion 5c side of the cooling flow path 5a)

with four fixation screws 18B. In each edge portion 10, four screw holes (not shown) into which the fixation screws 18A or 18B are screwed are provided. The four screw holes are provided in the vicinities of the four coupling members 9 excluding the coupling member 9 positioned at the central portion of the restraining plate 8 in the longitudinal direction.

The introduction duct 21 and the extraction duct 22 have extension portions 21b and extension portions 22b, respectively. The extension portions 21b and 22b extend along a plane (XY plane) orthogonal to the laminating direction to oppose the screw holes in the individual edge portions 10. Through holes corresponding to the screw holes in the edge portions 10 are formed in the extension portions 21b and 22b. The fixation screws 18A and 18B are inserted through the through holes and screwed into hole portions 19. Therefore, the introduction duct 21 and the extraction duct 22 are fixed to the edge portions 10.

As shown in FIG. 5 to FIG. 7, the power storage module 3 includes the electrode laminate 31, a resin sealing body 40, and pressure adjusting valves 52. The electrode laminate 31 includes a plurality of electrodes laminated along the laminating direction (Z-axis direction) of the power storage modules 3 through a separator 33. The plurality of electrodes include a negative terminal electrode 38, a positive terminal electrode 39, and a laminate of a plurality of bipolar electrodes 34 laminated between the negative terminal electrode 38 and the positive terminal electrode 39. It should be noted that, in the shown example, a current collecting foil 44 is disposed outside the negative terminal electrode 38, and a current collecting foil 45 is disposed outside the positive terminal electrode 39. In such an electrode laminate 31, a single cell is formed of a pair of electrodes opposing each other through the separator 33.

The bipolar electrode 34 has an electrode plate 35 including a first surface 35a and a second surface 35b opposite to the first surface 35a, a positive electrode 36 provided on the first surface 35a, and a negative electrode 37 provided on the second surface 35b. The positive electrode 36 is a positive electrode active material layer formed by applying a positive electrode active material to the electrode plate 35. The negative electrode 37 is a negative electrode active material layer formed by applying a negative electrode active material to the electrode plate 35. In the electrode laminate 31, the positive electrode 36 of one bipolar electrode 34 opposes the negative electrode 37 of another bipolar electrode 34 adjacent thereto in the laminating direction with the separator 33 therebetween. In the electrode laminate 31, the negative electrode 37 of one bipolar electrode 34 opposes the positive electrode 36 of another bipolar electrode 34 adjacent thereto in the laminating direction with the separator 33 therebetween. As described above, in the electrode laminate 31, the plurality of bipolar electrodes 34 are laminated in series through the separators 33.

The electrode plate 35 is formed of, for example, metal such as nickel or a nickel-plated steel plate. As an example, the electrode plate 35 is a rectangular nickel metal foil. An edge portion 35c of the electrode plate 35 has a rectangular frame shape and is a non-applied region to which neither a positive electrode active material nor a negative electrode active material is applied. Examples of the positive electrode active material that forms the positive electrode 36 include nickel hydroxide. Examples of the negative electrode active material that forms the negative electrode 37 include a hydrogen storage alloy. In the present embodiment, a region where the negative electrode 37 is formed on the second surface 35b of the electrode plate 35 is slightly larger than a region where the positive electrode 36 is formed on the first surface 35a of the electrode plate 35.

The negative terminal electrode 38 has the electrode plate 35 and the negative electrode 37 provided on the second surface 35b of the electrode plate 35. The negative terminal electrode 38 is disposed at one end of the electrode laminate 31 in the laminating direction such that the second surface 35b faces the central side of the electrode laminate 31 in the laminating direction. The first surface 35a of the electrode plate 35 of the negative terminal electrode 38 configures one outer surface of the electrode laminate 31 in the laminating direction. The negative electrode 37 provided on the second surface 35b of the electrode plate 35 of the negative terminal electrode 38 opposes the positive electrode 36 of the bipolar electrode 34 at one end of the electrode laminate 31 in the laminating direction through the separator 33. The negative terminal electrode 38 can be electrically connected to the conductive plate 5 disposed adjacent to the power storage module 3 (refer to FIG. 3) as described below.

The positive terminal electrode 39 has the electrode plate 35 and the positive electrode 36 provided on the first surface 35a of the electrode plate 35. The positive terminal electrode 39 is disposed at the other end of the electrode laminate 31 in the laminating direction such that the first surface 35a faces the central side of the electrode laminate 31 in the laminating direction. The second surface 35b of the electrode plate 35 of the positive terminal electrode 39 configures the other outer surface of the electrode laminate 31 in the laminating direction. The positive electrode 36 provided on the first surface 35a of the electrode plate 35 of the positive terminal electrode 39 opposes the negative electrode 37 of the bipolar electrode 34 at the other end of the electrode laminate 31 in the laminating direction through the separator 33. The positive terminal electrode 39 can be electrically connected to the conductive plate 5 disposed adjacent to the power storage module 3 (refer to FIG. 3) as described below.

The current collecting foil 44 may be the electrode plate 35 as an example. In the current collecting foil 44, neither a positive electrode active material nor a negative electrode active material is applied onto any of the first surface 35a and the second surface 35b of the electrode plate 35. The current collecting foil 44 and the negative terminal electrode 38 are in contact with each other. Similarly, the current collecting foil 45 may be the electrode plate 35 as an example. In the current collecting foil 45, neither a positive electrode active material nor a negative electrode active material is applied onto any of the first surface 35a and the second surface 35b of the electrode plate 35. The current collecting foil 45 and the positive terminal electrode 39 are in contact with each other. In the shown example, the current collecting foil 44 and the current collecting foil 45 are shown to be bent in a direction in which the current collecting foils approach each other, but the current collecting foil 44 and the current collecting foil 45 can be bent in a direction in which the current collecting foils move away from each other. For example, the current collecting foil 44 and the current collecting foil 45 can be bent to protrude outside in the laminating direction more than the end portions of a cylindrical portion 32 described below.

The separator 33 is formed in, for example, a sheet shape. Examples of the separator 33 include a porous film formed of a polyolefin-based resin such as polyethylene (PE) or polypropylene (PP), woven fabric or non-woven fabric formed of polypropylene, methyl cellulose, or the like, and the like. The separator 33 may be a separator reinforced with a vinylidene fluoride resin compound.

The electrode laminate 31 has electrode exposed portions 31b exposed from the sealing body 40 at one end and at the other end in the laminating direction (Z-axis direction). In the present embodiment, the electrode exposed portions 31b are the central regions of the current collecting foils 44 and 45 exposed from the sealing body 40. As an example, the electrode exposed portion 31b on one end side in the laminating direction is the central region of the first surface 35a of the current collecting foil 44 (electrode plate 35) exposed from the sealing body 40. As an example, the electrode exposed portion 31b on the other end side in the laminating direction is the central region of the second surface 35b of the current collecting foil 45 (electrode plate 35) exposed from the sealing body 40.

The sealing body 40 surrounds the side surfaces 31a (extending in the laminating direction) along the laminating direction (Z-axis direction) of the electrode laminate 31 and seals the internal space V formed between the electrodes adjacent to each other in the electrode laminate 31. The sealing body 40 has the cylindrical portion 32 that surrounds the side surfaces 31a. The cylindrical portion 32 has an outer peripheral surface 32a along the laminating direction (extending in the laminating direction) and a pair of end surfaces 32b facing the axial direction (Z-axis direction). The cylindrical portion 32 is formed in a rectangular tube shape as a whole. The cylindrical portion 32 is provided on the side surfaces 31a of the electrode laminate 31 to surround the edge portions 35c of the electrode plate 35. The cylindrical portion 32 holds the edge portions 35c on the side surfaces 31a. The cylindrical portion 32 is formed of, for example, an alkali-resistant insulating resin. Examples of a material that configures the cylindrical portion 32 include polypropylene (PP), polyphenylene sulfide (PPS), modified polyphenylene ether (modified PPE), and the like.

The cylindrical portion 32 has a plurality of first sealing portions 41 and a second sealing portion 42. The first sealing portion 41 is joined to the edge portion 35c of the electrode plate 35. The first sealing portion 41 is continuously provided throughout the entire circumference of the edge portion 35c on the first surface 35a of the electrode plate 35 and has a rectangular frame shape when seen in the laminating direction. In the present embodiment, the first sealing portions 41 are provided not only to the electrode plates 35 in the bipolar electrodes 34 but also to the electrode plates 35 in the negative terminal electrode 38, the positive terminal electrode 39, the current collecting foil 44, and the current collecting foil 45. That is, the bipolar electrodes 34, the negative terminal electrode 38, the positive terminal electrode 39, the current collecting foil 44, and the current collecting foil 45 each form an electrode unit where the first sealing portion 41 is provided on the electrode plate 35. It should be noted that, in the current collecting foil 45, the first sealing portion 41 is provided to both edge portions 35c on the first surface 35a and on the second surface 35b of the electrode plate 35.

The first sealing portion 41 is welded to the first surface 35a of the electrode plate 35 by, for example, at least one of ultrasonic waves, heat, and the like and is airtightly joined thereto. The first sealing portion 41 may be, for example, a film having a predetermined thickness in the laminating direction. In addition, the first sealing portion 41 partially having a step may be formed by laminating a plurality of films having a predetermined thickness. The inside portion of the first sealing portion 41 is positioned between the edge portions 35c of the electrode plates 35 adjacent to each other in the laminating direction. The outside portion of the first sealing portion 41 overhangs outside more than the edge of the electrode plate 35, and the distal end portion of the first sealing portion 41 is joined to the second sealing portion 42 with a welding layer 46. The welding layer 46 is formed by, for example, bonding the distal end portions of the first sealing portions 41 melted by hot plate welding to each other. The first sealing portions 41 adjacent to each other along the laminating direction may be separated from each other or may be in contact with each other. In addition, the outer edge portions of the first sealing portions 41 may be joined to each other by, for example, hot plate welding.

A region where the electrode plate 35 and the first sealing portion 41 overlap each other forms a joining region K between the electrode plate 35 and the first sealing portion 41. In the joining region K, the surface of the electrode plate 35 is roughened. The roughened region may be only the joining region K; however, in the present embodiment, the entire surface of the electrode plate 35 is fully roughened. Roughening can be realized by, for example, forming a plurality of protrusions by electroplating. Due to the plurality of protrusions, in the joining interface between the electrode plate 35 and the first sealing portion 41, a resin in a molten state enters portions between the plurality of protrusions formed by roughening, and an anchor effect is exhibited. Therefore, it is possible to improve the joining strength between the electrode plate 35 and the first sealing portion 41. The protrusions that are formed during roughening each have a shape that, for example, becomes thicker from the proximal end side toward the distal end side. Therefore, the sectional shape formed by the protrusions adjacent to each other becomes an undercut shape, and it becomes possible to enhance the anchor effect.

The second sealing portion 42 surrounds the first sealing portions 41 from the outside along the side surface 31a and is joined to each of the first sealing portions 41. The second sealing portion 42 is provided outside a unit laminate 43 made up of the electrode laminate 31 and the first sealing portions 41 and configures the outer wall of the power storage module 3. The second sealing portion 42 is formed by, for example, the injection molding of a resin and extends along the laminating direction throughout the entire length of the electrode laminate 31. The second sealing portion 42 has a rectangular tube shape extending along the laminating direction as the axial direction. The second sealing portion 42 is welded to the outer surfaces of the first sealing portions 41 with, for example, heat generated during the injection molding.

The first sealing portions 41 and the second sealing portion 42 form an internal space V between the electrodes adjacent to each other and seals the internal space V. More specifically, the second sealing portion 42 seal, together with the first sealing portions 41, a space between the bipolar electrodes 34 adjacent to each other along the laminating direction, a space between the negative terminal electrode 38 and the bipolar electrode 34 adjacent to each other along the laminating direction, and a space between the positive terminal electrode 39 and the bipolar electrode 34 adjacent to each other along the laminating direction, respectively. Therefore, airtightly partitioned internal spaces V are formed between the bipolar electrodes 34 adjacent to each other, between the negative terminal electrode 38 and the bipolar electrode 34, and between the positive terminal electrode 39 and the bipolar electrode 34, respectively.

As an example, in the present embodiment, 24 internal spaces V are formed with the electrodes laminated together. In these internal spaces V, for example, an electrolytic solution (not shown) containing an alkali solution such as an aqueous potassium hydroxide solution is accommodated.

The separators 33, the positive electrodes 36, and the negative electrodes 37 are impregnated with the electrolytic solution. The outer peripheral surface 32a of the cylindrical portion 32 is provided with a liquid injection port (not shown) for injecting the electrolytic solution into the internal spaces V. The outer peripheral surface 32a is formed of the outer peripheral surfaces of the second sealing portions 42.

In the present embodiment, the cylindrical portion 32 includes a pair of long side portions extending along the Y-axis direction and a pair of short side portions extending along the X-axis direction. The circumferential direction of the cylindrical portion 32 is the Y-axis direction in the long side portions and is the X-axis direction in the short side portions. The outer peripheral surface 32a faces the X-axis direction in the long side portions and faces the Y-axis direction in the short side portions. The liquid injection port (not shown) for injecting the electrolytic solution into the internal spaces V is provided on the outer peripheral surface 32a in one of the short side portions.

The sealing body 40 has overhangs 51 that are provided on the outer peripheral surface 32a of the cylindrical portion 32 and overhang from the outer peripheral surface 32a toward the outside of the electrode laminate 31. The overhang 51 protrudes from the outer peripheral surface 32a and extends along the circumferential direction of the cylindrical portion 32. In the present embodiment, the overhang 51 is provided on the outer peripheral surface 32a of the cylindrical portion 32 in each long side portion and extends along the circumferential direction (Y-axis direction) of the cylindrical portion 32.

The overhang 51 is reinforced with a plurality of ribs 53 provided on the outer peripheral surface 32a. The plurality of ribs 53 are provided at predetermined intervals in the extension direction (Y-axis direction) of the overhang 51. The overhang 51 and the ribs 53 are formed of, for example, an alkali-resistant insulating resin. The overhang 51 and the ribs 53 are formed of, for example, the same material as the cylindrical portion 32. The overhang 51 and the ribs 53 are integrally formed with the second sealing portion 42 by, for example, the injection molding of a resin.

The end surface 32b of the cylindrical portion 32 includes first portions 32A corresponding to the installation places of the overhang 51 and second portions 32B not corresponding to the installation places of the overhang 51. The first portions 32A and the overhangs 51 coincide with each other in the position in the circumferential direction of the cylindrical portion 32. The second portion 32B and the overhang 51 do not coincide with each other in the position in the circumferential direction of the cylindrical portion 32. In the present embodiment, the end surface 32b includes a pair of the first portions 32A and a pair of the second portions 32B. The first portion 32A is the end surface of the cylindrical portion 32 in a portion excluding both end portions of the long side portion. The first portion 32A has a pair of end portions 32Aa in the circumferential direction (Y-axis direction) of the cylindrical portion 32. The end portion 32Aa is a boundary portion with the second portion 32B in the first portion 32A. One of the second portions 32B is the end surface of a U-shaped portion made up of one of the short side portions of the cylindrical portion 32 and the end portions of the pair of long side portions on one of the short side portion sides. The other second portions 32B is the end surface of a U-shaped portion made up of the other short side portion of the cylindrical portion 32 and the end portions of the pair of long side portions on the other short side portion side. The first portions 32A and the second portions 32B are adjacent to each other in the circumferential direction of the cylindrical portion 32 (sealing body 40).

The outer peripheral surface 32a corresponding to the first portion 32A is adjacent to the side surface of the conductive plate 5A provided with the inlets (end portions 5b) and the outlets (end portions 5c) of the cooling flow paths 5a in the laminating direction. That is, the conductive plate 5 is disposed such that the inlets and the outlets of the cooling flow paths 5a correspond to the first portion 32A. The outer peripheral surface 32a corresponding to the first portion 32A and the side surface of the conductive plate 5A provided with the inlets and the outlets of the cooling flow paths 5a face the same direction (X-axis direction).

The overhang 51 is attached to a portion above the center of the outer peripheral surface 32a in the laminating direction and inclines downward. The length of the overhang 51 in the laminating direction is shorter than the length of the outer peripheral surface 32a in the laminating direction. The overhang 51 is disposed inside the outer peripheral surface 32a in the laminating direction. Therefore, the inlets (end portions 5b) and the outlets (end portions 5c) of the cooling flow paths 5a in the conductive plate 5A are not covered with the overhang 51. Therefore, it is possible to smoothly flow the cooling fluid in the cooling flow paths 5a.

The pressure adjusting valve 52 is attached to the outer peripheral surface 32a corresponding to one of the second portions 32B. The pressure adjusting valve 52 is connected to the liquid injection port (not shown) provided on the outer peripheral surface 32a and adjusts the pressure in the internal spaces V. In the present embodiment, two pressure adjusting valves 52 are attached to the outer peripheral surface 32a of one of the short side portions of the cylindrical portion 32.

Between the power storage modules 3 adjacent to each other in the laminating direction, at least a part of the portion between the sealing bodies 40 opposing each other is filled with the sealing member S. Two sealing members S are provided between the power storage modules 3 adjacent to each other in the laminating direction. The sealing member S seals the portion between the cylindrical portions 32 of the power storage modules 3 adjacent to each other in the laminating direction. The sealing member S is provided at least in the entire second portions 32B. In the present embodiment, the sealing member S is provided not only in the second portions 32B but also in the end portions 32Aa of the first portions 32A. The sealing member S is in contact with the second portions 32B and is also in contact with the end portions 32Aa of the first portions 32A.

The sealing member S extends along the circumferential direction of the cylindrical portion 32 (the X-axis direction in the short side portion and the Y-axis direction in the long side portion). The sealing member S has a pair of end portions Sa in the circumferential direction of the cylindrical portion 32. The end portions Sa are provided to be in contact with the end portions 32Aa. That is, the sealing member S is provided in the end portions 32Aa, and the overhangs 51 are provided on the outer peripheral surface 32a corresponding to the end portions 32Aa.

In the power storage modules 3 adjacent to each other in the laminating direction, the end surfaces 32b of the cylindrical portion 32 oppose each other. The sealing member S is interposed and compressed with the end surfaces 32b opposing each other in the laminating direction. Therefore, the sealing member S liquid-tightly seals the portion between the cylindrical portions 32. The sealing member S is provided to be in contact with the end surfaces 32b. The sealing member S is, for example, a sponge sealing member (foam sealing member) that is softer than the cylindrical portion 32 and has liquid tightness. Therefore, the sealing member S is easily compressed with the cylindrical portion 32 to adhere to the end surface 32b and exhibits the sealing property. Examples of a material that configures the sealing member S include ethylene propylene diene rubber (EPDM) and the like. The sealing member S is formed of, for example, an alkali-resistant insulating resin.

FIG. 5 and FIG. 6 show a state of the power storage modules 3 before being laminated. When the power storage modules 3 are laminated, the sealing member S is disposed in advance on the end surfaces 32b of the cylindrical portion 32 as shown in, for example, FIG. 5 and FIG. 6. The power storage modules 3 are sequentially laminated with the sealing member S disposed, whereby the sealing member S is interposed with the power storage modules 3 adjacent to each other in the laminating direction. The sealing member S is adhered to, for example, the end surfaces 32b. Therefore, the misalignment of the sealing member S during and after the lamination of the power storage modules 3 is suppressed.

As described above, in this power storage device 1, between the power storage modules 3 adjacent to each other in the laminating direction, at least a part of the portion between the sealing bodies 40 opposing each other is filled with the sealing member S. Therefore, even when the electrolytic solution leaks from the internal space V of the power storage module 3 and flows out to the outer peripheral surface 32a, in the portion filled with the sealing member S, it is possible to suppress the entering of the electrolytic solution that propagates on the outer peripheral surface 32a. Therefore, it is possible to suppress the occurrence of a short circuit between the power storage modules 3 via the electrolytic solution that propagates on the outer peripheral surface 32a. In addition, in the portion filled with the sealing member S, the electrolytic solution flowing out to the outer peripheral surface 32a is suppressed. Even with this configuration, it is possible to suppress the occurrence of a short circuit between the power storage modules 3 via the electrolytic solution that propagates on the outer peripheral surface 32a. It should be noted that, as the cause for the liquid leakage of the power storage module 3, for example, at least one of the alkaline creep phenomenon, damage to the electrode plates 35 including the current collecting foils 45 and 44, and the like can be considered.

The end surface 32b of the sealing body 40 has the first portion 32A corresponding to the installation place of the overhang 51 on the outer peripheral surface 32a and the second portion 32B not corresponding to the installation place. The sealing member S is provided on at least the second portion 32B. In the first portion 32A, since the electrolytic solution propagates on the overhang 51 and falls even when the electrolytic solution flows out to the outer peripheral surface 32a, it is possible to suppress the entering of the electrolytic solution. Since the sealing member S is provided in the second portion 32B, the entering of the electrolytic solution is suppressed. Therefore, it is possible to reliably suppress the occurrence of a short circuit between the power storage modules 3 via the electrolytic solution that propagates on the outer peripheral surface 32a. In addition, in the second portion 32B, the electrolytic solution flowing out to the outer peripheral surface 32a is suppressed. The electrolytic solution is guided to the first portion 32A side with the sealing member S. The electrolytic solution that has flowed out from the first portion 32A side to the outer peripheral surface 32a propagates on the overhang 51 and falls as described above.

The first portion 32A and the second portion 32B are adjacent to each other in the circumferential direction of the sealing body 40, and the sealing member S is also provided in the first portion 32A. Specifically, the sealing member S is also provided at the end portion 32Aa of the first portion 32A. Since the end portion 32Aa is the boundary portion with the second portion 32B in the first portion 32A, the electrolytic solution is likely to reach the end portion 32Aa of the outer peripheral surface 32a where the overhang 51 is not provided. However, since the sealing member S is provided in the end portion 32Aa, it is possible to suppress the entering of the electrolytic solution. As a result, it is possible to further suppress a short circuit between the power storage modules 3 caused by liquid leakage. In addition, the electrolytic solution that has flowed out from the end portion 32Aa is likely to reach a place on the outer peripheral surface 32a where the overhang 51 is not provided. However, since the sealing member S is provided in the end portion 32Aa, it is possible to suppress the electrolytic solution flowing out from the end portion 32Aa to the outer peripheral surface 32a and reaching the outer peripheral surface 32a of the second portion 32B.

The plurality of cooling flow paths 5a configured to flow the cooling fluid are formed in the conductive plate 5A, and the conductive plate 5A is disposed such that the inlets (end portions 5b) and the outlets (end portions 5c) of the cooling flow paths 5a correspond to the first portion 32A. The overhangs 51 are provided on the outer peripheral surface 32a corresponding to the first portions 32A, and it is possible to suppress a short circuit between the power storage modules 3 with the overhang 51. Therefore, since it is not necessary to provide the sealing member S in the first portions 32A, the end portions 5b and 5c of the cooling flow paths 5a being blocked by the sealing member S is suppressed.

The pressure adjusting valves 52 are attached to the outer peripheral surface 32a corresponding to one of the second portions 32B. Since the overhang 51 is not provided on the outer peripheral surface 32a corresponding to the second portions 32B, it is possible to easily attach the pressure adjusting valves 52 to the outer peripheral surface. Since the pressure adjusting valves 52 are attached to the outer peripheral surface 32a corresponding to one of the second portions 32B, there is no space for providing the overhang 51. According to the sealing member S, since it is possible to suppress the entering of the electrolytic solution even in one of the second portions 32B where there is no space for providing the overhang 51 on the corresponding outer peripheral surface 32a as described above, it is possible to suppress the occurrence of a short circuit between the power storage modules 3. In the present embodiment, the pressure adjusting valves 52 are not provided on the other second portion 32B. Therefore, it is possible to dispose, for example, a different member (not shown) to be in contact with the outer peripheral surface 32a of the other second portion 32B.

The sealing member S is adhered to the end surfaces 32b of the cylindrical portion 32. Therefore, the misalignment of the sealing member S is suppressed.

Hitherto, the power storage device 1 according to the embodiment has been described, but the present invention is not limited to the above-described embodiment. For example, the overhang 51 may be provided on the outer peripheral surface 32a corresponding to the other second portion 32B. The sealing member S is disposed to be in contact with the second sealing portion 42 on the end surface 32b, but may be disposed to be in contact with the first sealing portion 41 or may be disposed to be in contact with both the first sealing portion 41 and the second sealing portion 42. The overhangs 51 may be provided side by side in two or more rows in the laminating direction, may each protrude from the outer peripheral surface 32a, and may extend in the circumferential direction of the cylindrical portion 32.

What is claimed is:

1. A power storage device comprising:
a plurality of power storage modules laminated;
a conductive plate; and
a sealing member,
wherein the conductive plate and the sealing member are provided between the power storage modules adjacent to each other in a laminating direction of the power storage modules,
the plurality of power storage modules each have an electrode laminate including a plurality of electrodes laminated along the laminating direction through a separator, an electrolytic solution accommodated in an internal space formed between the electrodes adjacent to each other, and a sealing body configured to surround a side surface of the electrode laminate along the laminating direction and to seal the internal space,
the plurality of electrodes have a negative terminal electrode, a positive terminal electrode, and a plurality of bipolar electrodes laminated between the negative terminal electrode and the positive terminal electrode,
the plurality of bipolar electrodes each have an electrode plate, a positive electrode provided on a first surface of the electrode plate, and a negative electrode provided on a second surface of the electrode plate,
the electrode laminate has electrode exposed portions exposed from the sealing body at one end and the other end in the laminating direction,
the sealing body includes a first sealing portion joined to the electrode plate and a second sealing portion surrounding an outer periphery of the first sealing portion, and
the conductive plate is disposed between the power storage modules adjacent to each other in the laminating direction, so as to be in contact with the electrode exposed portion of each of the power storage modules adjacent to each other, and the sealing member fills at least a portion between the sealing body of each of the power storage modules adjacent to each other,
wherein the sealing member is formed of a material different from a material of the sealing body,
wherein the sealing body has an outer peripheral surface along the laminating direction and a pair of end surfaces facing the laminating direction, the sealing body further includes an overhang provided on the outer peripheral surface of the sealing body so as to protrude from an outer peripheral surface of the second sealing portion in a direction intersecting the laminating direction,
the end surfaces of the sealing body each have a first portion corresponding to an overhang installation place and a second portion not corresponding to the installation place, and
the sealing member is provided at least on the second portion.

2. The power storage device according to claim 1, wherein, in each of the power storage modules, the first portion and the second portion are adjacent to each other in a circumferential direction of the sealing body,
the sealing body is formed in a rectangular tube shape so as to include a pair of long side portions and a pair of short side portions, and the overhang is located on the pair of long side portions of the sealing body,
the first portion is an end surface of the pair of long side portions in a location excluding both end portions of the pair of long side portions,
the second portion is an end surface of the pair of short side portions and both end portions of the pair of long side portions, and
the sealing member is provided on the sealing body so as to extend from the second portion to the first portion.

3. The power storage device according to claim 1, wherein a cooling flow path through which a cooling fluid flows is formed in the conductive plate, and
the conductive plate is disposed such that an inlet and an outlet of the cooling flow path correspond to the first portion.

4. The power storage device according to claim 2, wherein a cooling flow path through which a cooling fluid flows is formed in the conductive plate, and
the conductive plate is disposed such that an inlet and an outlet of the cooling flow path correspond to the first portion.

5. The power storage device according to claim 1, wherein each of the power storage modules has a pressure adjusting valve configured to adjust a pressure of the internal space, and
the pressure adjusting valve is attached to the outer peripheral surface corresponding to the second portion.

6. The power storage device according to claim 2, wherein each of the power storage modules has a pressure adjusting valve configured to adjust a pressure of the internal space, and
the pressure adjusting valve is attached to the outer peripheral surface corresponding to the second portion.

7. The power storage device according to claim 3, wherein each of the power storage modules has a pressure adjusting valve configured to adjust a pressure of the internal space, and
the pressure adjusting valve is attached to the outer peripheral surface corresponding to the second portion.

8. The power storage device according to claim 1, wherein the sealing member is adhered to the sealing body.

9. The power storage device according to claim 2, wherein the sealing member is adhered to the sealing body.

10. The power storage device according to claim 3, wherein the sealing member is adhered to the sealing body.

11. The power storage device according to claim 4, wherein the sealing member is adhered to the sealing body.

* * * * *